United States Patent
Poncelet et al.

(10) Patent No.: US 10,512,892 B2
(45) Date of Patent: Dec. 24, 2019

(54) PROCESS FOR THE SYNTHESIS OF HYBRID ALLOPHANE

(71) Applicant: COMMISSARIAT A L'ENERGIE ATOMIQUE ET AUX ENERGIES ALTERNATIVES, Paris (FR)

(72) Inventors: Olivier Poncelet, Grenoble (FR); Antoine Thill, Fontenay aux Roses (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 339 days.

(21) Appl. No.: 15/323,512

(22) PCT Filed: Jul. 2, 2015

(86) PCT No.: PCT/EP2015/065128
§ 371 (c)(1),
(2) Date: Jan. 3, 2017

(87) PCT Pub. No.: WO2016/001373
PCT Pub. Date: Jan. 7, 2016

(65) Prior Publication Data
US 2017/0128909 A1 May 11, 2017

(30) Foreign Application Priority Data
Jul. 3, 2014 (FR) ..................................... 14 56382

(51) Int. Cl.
*B01J 20/22* (2006.01)
*B01J 20/28* (2006.01)
*B01J 20/16* (2006.01)
*B01J 20/30* (2006.01)
*B01J 20/32* (2006.01)
*C01B 33/26* (2006.01)

(52) U.S. Cl.
CPC ............ *B01J 20/223* (2013.01); *B01J 20/16* (2013.01); *B01J 20/28019* (2013.01); *B01J 20/28021* (2013.01); *B01J 20/3078* (2013.01); *B01J 20/3085* (2013.01); *B01J 20/3246* (2013.01); *C01B 33/26* (2013.01)

(58) Field of Classification Search
CPC .... B01J 20/223; B01J 20/16; B01J 20/28019; B01J 20/28021; B01J 20/3085; B01J 20/3246; B01J 20/28016; B01J 20/30; B01J 20/3078; C01B 33/26
See application file for complete search history.

(56) References Cited

U.S. PATENT DOCUMENTS

| | | | | |
|---|---|---|---|---|
| 4,152,404 A * | 5/1979 | Farmer | ................... | B01D 53/02 423/327.1 |
| 5,714,309 A * | 2/1998 | Poncelet | ................. | C01B 33/26 252/519.1 |
| 5,888,711 A * | 3/1999 | Poncelet | ................. | C01B 33/26 252/519.32 |
| 6,099,894 A * | 8/2000 | Holman | .................... | B01J 13/02 427/126.3 |
| 6,254,845 B1 | 7/2001 | Ohashi et al. | | |
| 6,296,825 B1 * | 10/2001 | Rigola | .................... | C01B 33/26 423/327.1 |
| 6,468,492 B2 * | 10/2002 | Poncelet | ................. | B01J 20/16 423/328.1 |
| 8,124,220 B2 * | 2/2012 | Poncelet | .............. | B41M 5/5218 423/328.1 |
| 2005/0238559 A1 * | 10/2005 | Poncelet | ................. | C01B 33/26 423/328.1 |

FOREIGN PATENT DOCUMENTS

| | | |
|---|---|---|
| FR | 2 842 515 A1 | 1/2004 |
| FR | 2845515 A1 | 4/2004 |
| FR | 2998560 A1 | 5/2014 |
| JP | 2002-159850 A | 6/2002 |

OTHER PUBLICATIONS

Reinert et al. Characterization and boron adsorption of hydrothermally synthesised allophanes. Applied Clay Science 54 (2011) 274-280. (Year: 2011).*

Opiso et al. Adsorption and co-precipitation behavior of arsenate, chromate, selenate and boric acid with synthetic allophane-like materials. Journal of Hazardous Materials 170 (2009) 79-86. (Year: 2009).*

Lindner et al. Hollow nanospheres, allophanes 'All-organic' synthesis and characterization. Microporous and Mesoporous Materials 21 ( 1998) 381-386. (Year: 1998).*

Bottero, Ilaria et al., "Synthesis and characterization of hybrid organic/inorganic nanotubes of the imogolite type and their behaviour towards methane adsorption", Physical Chemistry Chemical Physics, vol. 13, No. 2, pp. 744-750.

(Continued)

*Primary Examiner* — Katherine Zalasky
(74) *Attorney, Agent, or Firm* — Oliff PLC

(57) ABSTRACT

A process for preparing hollow particles of aluminosilicates having a spherical shape of allophane type which are hybrid at the core, comprising:

(a) having, at ambient temperature, an aqueous medium containing at least one aluminum precursor and one silicon alkoxide in an Al/Si molar ratio varying from 1 to 3, (b) carrying out, with stirring, the alkaline hydrolysis of said medium with gradual addition of at least one base in a base/Al molar ratio of 2.3 to 3, (c) maintaining, on conclusion of the addition of all of said base, stirring at ambient temperature until said medium is obtained in the clear state, and (d) heating the solution obtained at a temperature varying from 50 to 150° C. for 2 to 8 days, the combined stages (a) to (d) are carried out within a reactor consisting of a material which is chemically inert with respect to the reactants and expected aluminosilicate.

12 Claims, No Drawings

(56) References Cited

OTHER PUBLICATIONS

Sep. 7, 2015 International Search Report issued in Patent Application No. PCT/EP2015/065128.
U.S. Appl. No. 15/323,630, filed in the name of Olivier Poncelet et al.
Apr. 20, 2018 Office Action issued in U.S. Appl. No. 15/323,630.

* cited by examiner

PROCESS FOR THE SYNTHESIS OF HYBRID ALLOPHANE

The present invention is targeted at providing a process for the preparation of hollow aluminosilicate Particles of hybrid allophane type at the core. More specifically, it provides a process which makes it possible to synthesize aluminosilicates having a hollow spherical shape, the internal silicon atoms of which are in a proportion of at least 90% by number and preferably 100% by number functionalized by a hydrophobic hydrocarbon radical.

Allophanes are aluminosilicate $(OH)_3Al_2O_3SiOH$ spheres and exist naturally in natural formations. They are related to imogolites of the same formula and of the same chemical anisotropy but which on the other hand exist in the form of hollow filaments, also described as nanotubes.

The external surface of allophanes is covered with Al—OH, while their internal surface is covered with Si—OH. The interior of the spheres is filled with water and, on the wall of the nanospheres, pores of 0.7 to 1 nm appear, which pores make it possible for the water to be exchanged with the outside.

These materials are highly advantageous, in particular from the viewpoint of their transparency.

In order to meet the need industrially for materials of this type, many processes have thus been developed.

Thus, the U.S. Pat. No. 6,254,845 describes a process for the preparation of hollow spheres of polymers of amorphous aluminosilicate. This process consists in mixing, at high speed, a silicon-based compound with an aluminum-based compound in order to form a suspension comprising precursor particles and a salt in solution.

The latter is subsequently removed and the particles of the precursor are subjected to a heat treatment in order to obtain the expected hollow spheres of aluminosilicates.

More recently, it has been found that the introduction of organic functional groups within aluminosilicate of allophane or imogolite type makes it possible to access novel properties with respect to conventional aluminosilicates. These novel synthetic polymers are then referred to as hybrid polymers.

Thus, the document FR 2 845 515 describes the synthesis of "partially hybrid" allophanes, insofar as the inside of the hollow spheres is covered with 50% by number of Si—OH and with 50% by number of S—R, with R being a methyl or vinyl group. It should be noted that the presence of nonhydrolyzable groups on the internal surface has the consequence of generating an increase in the diameter of these partially hybrid spheres. Their diameter changes from 5 nm to 10 nm.

To the knowledge of the inventors, there to date does not exist, however, a process which makes it possible to access hollow particles of aluminosilicates of allophane type having a completely hybrid cavity.

It is specifically a subject matter of the present invention to provide a process in accordance with this expectation.

More specifically, the present invention relates to a process for preparing hollow particles of aluminosilicates having spherical shape of allophane type and having a hybrid core comprising at least the stages consisting in:

(a) having available, at ambient temperature, an aqueous medium containing at least one aluminum precursor and one silicon alkoxide in an Al/Si molar ratio varying from 1 to 3, (b) carrying out, with stirring, the alkaline hydrolysis of said medium with gradual addition of at least one base in a base/aluminum molar ratio preferably of 2.3 to 3, (c) maintaining, on conclusion of the addition of all of the base, the stirring at ambient temperature until said medium is obtained in the clear state, and (d) heating the solution obtained at a temperature varying from 50 to 150° C. for 2 to 8 days, characterized in that the combined stages (b) to (d) carried out within a reactor consisting of a material which is chemically inert with respect to the reactants and said expected aluminosilicate.

According to a preferred alternative form, the combined stages (a) to (d) are carried out consecutively within one and the same reactor.

More particularly, the constituent material of said reactor is devoid of a silanol group and of a free fluorine atom.

More specifically, the constituent material of the reactor is different from glass and Teflon.

Advantageously, the constituent material of the reactor is chosen from stainless steel, polypropylene or inert porcelains, in particular which are in accordance with those employed in industrial chemical reactors.

Thus, the process according to the invention is advantageously carried out in the absence of a free silanol group.

According to another preferred alternative form, the silicon alkoxide is of formula $RSi(OR')_3$ in which R' is a $C_1$ to $C_2$ alkyl group and R is a saturated or unsaturated $C_1$ to $C_2$ hydrocarbon group.

More preferably, it is methyltrimethoxysilane $(OCH_3)_3SiCH_3$ and/or vinyltrimethoxysilane $(OCH_3)_3Si(CH=CH_2)$.

Contrary to all expectation, the inventors have thus found that the choice of a specific material for the reactor dedicated to the preparation of aluminosilicate makes it possible to access an aluminosilicate advantageously reproducing the anisotropy of allophane, while being having a hybrid core.

Within the meaning of the invention, the expression having a hybrid core is intended to describe the fact that at least 90% by number of the silicon atoms present on the internal face of said cavity are functionalized by a hydrocarbon radical. This monitoring of the degree of functionalization may in particular be carried out by thermogravimetric analysis, referred to as TGA technology, coupled to infrared spectrometry.

The hollow particles of aluminosilicates obtained according to the invention prove, of course, to be compatible with a great variety of applications, in particular taking advantage of their internal cavity to convey or trap a great diversity of molecules of interest having a hydrophobic nature (cosmetic active principles, pharmaceutical active principles, plasticizers, pesticides, hormones, and the like).

Generally, a substance is said to be hydrophobic when it exhibits a very low, indeed even a complete lack of, affinity for an aqueous medium. This lack of affinity is also reflected by a very low, indeed even a lack of, aqueous solubility. By way of indication, a compound is said to be immiscible in water if less than 3%, preferably less than 2%, for example less than 1%, by weight of this compound is in the dissolved form in water.

According to an advantageous embodiment, the precursor of the aluminum employed during stage (a) is chosen from aluminum perchlorate $Al(ClO_4)_3$, aluminum nitrate $Al(NO_3)_3$ or aluminum chloride $AlCl_3$ and is preferably aluminum perchlorate $Al(ClO_4)_3$.

According to a specific embodiment, the Al/Si molar ratio of stage (a) is between 1.5 and 2.5.

The aluminum concentration of the aqueous solution in stage (a) may be between 0.01 and 1 mol·l$^{-1}$ and preferably between 0.05 and 0.1 mol·l$^{-1}$.

Advantageously, the silicon alkoxide or the mixture of silicon alkoxides hydrolyzed during stage (b) corresponds to the formula R—Si(OR')$_3$ in which R' is a linear or branched $C_1$-$C_6$ alkyl or alkenyl group or a phenyl group, it being possible for said R group to optionally carry a substituent chosen from —OH, —NH$_2$, —COOH, a phenyl group or a halogen atom, and R is a linear or branched $C_1$-$C_{12}$ alkyl group.

Preferably, R' represents a methyl, ethyl, propyl, butyl or vinyl group and more preferably still R is a methyl or vinyl group. Preferably, R is a methyl, ethyl or propyl group and more preferably still R is a methyl group.

As stated above, the preferred silicon alkoxides are methyltrimethoxysilane (OCH$_3$)$_3$SiCH$_3$ and vinyltrimethoxysilane (OCH$_3$)$_3$Si (CH═CH$_2$).

The base/aluminum molar ratio (ratio of the concentration of base added to the amount of aluminum initially present), also referred to as hydrolysis ratio, is a synthesis parameter well known to a person skilled in the art which may be determined throughout the reaction from the pH.

The base added during stage (b) may be chosen from sodium hydroxide, potassium hydroxide or lithium hydroxide and said base is preferably sodium hydroxide. Its concentration may be between 0.1 and 3 mol·l$^{-1}$. During stage (b), the addition of the base is advantageously carried out at a flow rate of between 50 and 300 ml·h$^{-1}$ and preferably between 100 and 280 ml·h$^{-1}$.

The mixture thus obtained is kept stirred at ambient temperature, that is to say at a temperature capable of varying from 18 to 25° C., until the medium becomes completely clear. This clarity may in particular be monitored by spectroscopy. It corresponds to between 95% and 100% of transmission in the visible region measured by a UV-visible spectrometry in a cell with a side width of 1 cm over the whole of the visible spectrum. This clarity may be obtained after stirring for 8 to 12 hours. This is because this stirring time is capable of varying according to the chemical nature of the silicon alkoxide selected for the process.

The heating of stage (d) may be carried out at a temperature of between 70 and 150° C. and preferably between 80 and 100° C., either in an autoclave or in an oven or at reflux.

According to an advantageous embodiment, the duration of the heating stage (d) is between 4 and 8 days.

The process of the invention may in addition comprise a stage (e) of washing or concentrating the solution obtained on conclusion of stage (d). The washing stage serves to remove, from the reaction medium, the by-products formed during the preceding stages, such as the residual ions originating from the base used during stage (b) or the alcohols originating from the hydrolysis of the alkoxide. Stage (d) may thus be carried out by dialysis or by concentrating, preferably by ultrafiltration. The hollow particles of hybrid aluminosilicates thus purified may be recovered according to conventional techniques.

The characterization of their surface potential, measured by zetametry, shows that it is in accordance with that of nonfunctionalized allophane spheres. It varies from +30 mV to +40 mV.

Another subject matter of the invention is the hybrid hollow particles of allophane type having a spherical shape as such, capable of being obtained according to the process of the invention and simultaneously comprising a hydrophilic external surface and a 100% hydrophobic internal surface.

The presence of an internal cavity in these spheres may furthermore be characterized by SAXS analysis. Thus, by comparing the signal obtained by scattering of the X-rays with a homogeneous electron density model, it may be deduced that the hybrid allophanes have a wall of the order of 5 to 7 ∪ in thickness and thus a hydrophobic cavity with a size of between 2.5 and 5 nm.

The particles according to the invention prove to be particularly advantageous as vehicles or for the trapping of molecules of interest and in particular hydrophobic molecules.

Thus, another aspect of the invention is the use of the hollow Particles of aluminosilicates having spherical shape according to the claims for the purposes of conveying or trapping at least one hydrophobic molecule of interest.

Generally, a substance is said to be hydrophobic when it exhibits a very low, indeed even a complete lack of, affinity for an aqueous medium. This lack of affinity is also reflected by a very low, indeed even a lack of, aqueous solubility. By way of indication, a compound is said to be immiscible in water if less than 3%, preferably less than 2%, for example less than 1%, by weight of this compound is in the dissolved form in water.

The invention is targeted in addition at a particle in accordance with the invention containing at least one hydrophobic molecule of interest in particular chosen, for example, from therapeutic active agents, plant protection active agents, surfactants, insecticides, coloring materials, markers, and the like.

The examples below are presented by way of illustration and without limitation of the present invention.

EXAMPLE 1

Synthesis of (OH)$_3$Al$_2$O$_3$SiMe 32.46 g of Al(ClO$_4$)$_3$·9H$_2$O are added to 700 ml of DI water in a vessel made of polypropylene or of stainless steel. The medium is left stirring for ½ hour. 4.53 g of MeSi (OMe)$_3$ are subsequently added. The homogeneous reaction mixture is kept stirred at ambient temperature.

A fresh sodium hydroxide solution (5.33 g of NaOH in 1333 ml of DI water) is subsequently added to a dropping funnel. The addition is carried out at the rate of 250 ml per minute. The reaction medium is clear after ¼ hour. The reaction medium is stirred at ambient temperature for 12 hours before being heated at 90° C. for 5 days in a vessel made of polypropylene or of stainless steel. After cooling at ambient temperature, the reaction medium is washed (diafiltered) and concentrated by ultrafiltration through a 10 kD membrane.

The (OH)$_3$Al$_2$O$_3$SiMe yield with respect to the aluminum introduced is 76% (mean measurement over three batches: two in polypropylene bottles and one in a stainless steel vessel).

At 10% by weight of (OH)$_3$Al$_2$O$_3$SiMe, the aqueous colloidal sol is completely transparent and clear. The surface potential, measured by zetametry, is +40 mV, which is comparable to a conventional allophane. The SAXS also reveals that hollow spheres are concerned.

EXAMPLE 2

Synthesis of (OH)$_3$Al$_2$O$_3$Sivinyl

The procedure selected is that of example 1, except that 50 ml of EtOH were added to the aqueous medium in order to bring about therein the "solubility/dispersion" of (OMe)$_3$Sivinyl.

The (OH)$_3$Al$_2$O$_3$Sivinyl yield with respect to the aluminum introduced is 67% (obtained over three batches: 2 in a stainless steel vessel and 1 in a polypropylene vessel). The zeta potential is +37 mV.

The invention claimed is:
1. Process for preparing hollow particles of aluminosilicates having a spherical shape of allophane type which are hybrid at the core, the process comprising:
   (a) having available, at ambient temperature, an aqueous medium containing at least one aluminum precursor and one silicon alkoxide in an Al/Si molar ratio ranging from 1 to 3,
   (b) carrying out, with stirring, the alkaline hydrolysis of said medium with gradual addition of at least one base in a base/Al molar ratio of 2.3 to 3,
   (c) maintaining, on conclusion of the addition of all of said base, the stirring at ambient temperature until a clear solution is obtained, and
   (d) heating the clear solution obtained at a temperature ranging from 50 to 150° C. for 2 to 8 days,
   wherein the combined stages (b) to (d) are carried out within one rector comprising a material which is chemically inert with respect to reactants used in the process and the particles of aluminosilicate,
   said hollow particles of aluminosilicates having at least 90% by number of the silicon atoms present on an internal face of a cavity functionalized by a hydrocarbon radical.

2. Process according to claim 1, in which the combined stages (a) to (d) are carried out consecutively within the same reactor.

3. Process according to claim 1, in which the material constituting the reactor is devoid of a silanol group and of a free fluorine atom.

4. Process according to claim 1, in which the material constituting the reactor is chosen from stainless steel, polypropylene and inert porcelains.

5. Process according to claim 1, in which the silicon alkoxide is of formula $RSi(OR')_3$ in which R' is a $C_1$ to $C_2$ alkyl group and R is a saturated or unsaturated $C_1$ to $C_2$ hydrocarbon group.

6. Process according to claim 1, in which the silicon alkoxide is methyltrimethoxysilane $(OCH_3)_3SiCH_3$ and/or vinyltrimethoxysilane $(OCH_3)_3Si(CH=CH_2)$.

7. Process according to claim 1, in which the aluminum precursor is chosen from aluminum perchlorate $Al(ClO_4)_3$, aluminum nitrate $Al(NO_3)_3$ or aluminum chloride $AlCl_3$.

8. Process according to claim 1, in which the Al/Si molar ratio of stage (a) is between 1.5 and 2.5.

9. Process according to claim 1, in which the base added during stage (b) is chosen from sodium hydroxide, potassium hydroxide or lithium hydroxide.

10. Process according to claim 1, in which the addition of the base during stage (b) is carried out at a flow rate of between 50 and 300 ml·h$^{-1}$.

11. Process according to claim 1, in which the heating stage (d) is carried out at a temperature of between 70 and 150° C.

12. Process according to claim 1, wherein it comprises, following stage (d), a stage (e) of ultrafiltration of a solution obtained from stage (d).

* * * * *